United States Patent
Wangoo et al.

(10) Patent No.: US 7,657,608 B2
(45) Date of Patent: Feb. 2, 2010

(54) METHOD AND SYSTEM FOR DISTRIBUTING A DOCUMENT TO AT LEAST ONE DESTINATION

(75) Inventors: Sanjay Wangoo, Lake Forest, CA (US); Manoj Verma, Lake Forest, CA (US)

(73) Assignees: Toshiba Corporation (JP); Toshiba Tec Kabushiki Kaisha (JP)

( * ) Notice: Subject to any disclaimer, the term of this patent is extended or adjusted under 35 U.S.C. 154(b) by 865 days.

(21) Appl. No.: 10/675,737

(22) Filed: Mar. 4, 2004

(65) Prior Publication Data

US 2005/0198347 A1 Sep. 8, 2005

(51) Int. Cl.
*G06F 15/16* (2006.01)
(52) U.S. Cl. ............. 709/218; 358/1.15; 414/789.7
(58) Field of Classification Search ........... 709/218; 358/1.15; 414/789.7
See application file for complete search history.

(56) References Cited

U.S. PATENT DOCUMENTS

| | | | |
|---|---|---|---|
| 5,126,858 A | | 6/1992 | Kurogane et al. |
| 5,539,530 A | | 7/1996 | Reifman et al. |
| 5,689,625 A | | 11/1997 | Austin et al. |
| 5,761,396 A | | 6/1998 | Austin et al. |
| 5,781,711 A | | 7/1998 | Austin et al. |
| 5,870,089 A | | 2/1999 | Fabbio et al. |
| 5,897,260 A | * | 4/1999 | Zingher ............. 400/719 |
| 5,917,615 A | | 6/1999 | Reifman et al. |
| 6,498,656 B1 | * | 12/2002 | Mastie et al. ........... 358/1.15 |
| 6,535,791 B1 | * | 3/2003 | Wang ............. 700/235 |
| 7,167,260 B2 | * | 1/2007 | Iwata et al. ........... 358/1.15 |
| 7,190,477 B2 | * | 3/2007 | Ferlitsch ............. 358/1.15 |
| RE39,641 E | * | 5/2007 | Nickerson ........... 358/442 |
| 2002/0069234 A1 | | 6/2002 | McIntyre |
| 2002/0097424 A1 | | 7/2002 | Ferlitsch |
| 2002/0101600 A1 | * | 8/2002 | Sabbagh et al. ........... 358/1.13 |
| 2002/0116470 A1 | | 8/2002 | Dyer et al. |
| 2002/0161800 A1 | | 10/2002 | Eld et al. |
| 2002/0184342 A1 | | 12/2002 | Kennedy et al. |
| 2002/0198842 A1 | | 12/2002 | Kurtz et al. |
| 2003/0011812 A1 | | 1/2003 | Sesek et al. |
| 2003/0033353 A1 | | 2/2003 | Simpson et al. |
| 2003/0048303 A1 | | 3/2003 | Mesa et al. |
| 2003/0117664 A1 | | 6/2003 | McCarthy, Jr. |
| 2003/0182575 A1 | * | 9/2003 | Korfanta ............. 713/201 |

OTHER PUBLICATIONS

European Search Report dated Dec. 6, 2006, for European Application No. 04 020 656.7, filed Aug. 31, 2004.

* cited by examiner

*Primary Examiner*—William C Vaughn, Jr.
*Assistant Examiner*—Mohamed Ibrahim
(74) *Attorney, Agent, or Firm*—Tucker Ellis & West LLP

(57) ABSTRACT

This invention is related to a document distribution system, and more particularly, the present invention relates to a document distribution system that reduces network traffic. The present invention is directed to a method and system for distributing a document to at least one destination, comprising the steps of providing a document to be distributed; creating a job by associating the document with at least one printer job language command, wherein the printer job language command provides instructions for the distribution of the job; and distributing, on the basis of the printer job language command, the job to at least one destination.

11 Claims, 3 Drawing Sheets

METHOD AND SYSTEM FOR DISTRIBUTING A DOCUMENT TO AT LEAST ONE DESTINATION

BACKGROUND OF THE INVENTION

The present invention relates to a document distribution system, and more particularly, the present invention relates to a document distribution system that reduces network traffic.

Enterprises around the world are recognizing that information is the currency of their business. As such, there is tremendous value in ensuring that all corporate information, whether in structured or unstructured formats is captured, managed, and put to work in a meaningful and efficient way. Document management and content management solutions help organizations maximize the use of their unstructured data, which in turn helps maximize the use of their corporate knowledge. Unstructured data is information stored in text files, emails, documents, multimedia, etc.

Document management systems provide organizations with an ability to create centralized repositories, or libraries, containing all of the unstructured data they generate. Powerful search and retrieval tools make this information easily available for use and collaboration across the entire enterprise. These tools often provide security and version control capabilities. However, storing and retrieving large numbers of paper documents has, in the past, been an onerous task. Present document management systems solve some of the problems faced by organizations that use a manual document filing system alongside an electronic document system. These systems provide a method for combining both computer-generated image documents and paper documents in a secure document storage and retrieval system.

Document management systems provide a means for freeing up storage space and reducing the costs of paper document copying and distribution. They often provide multiple methods of adding documents and indexing information to the document management system while facilitating easy revisions, creation of new versions, annotation, and document sharing. One of the most important aspects of document management systems is their ability to eliminate time-consuming physical searches for misfiled or lost documents. Some document management systems allow users to save various types of documents in a single location (i.e. related client emails and Word documents in the same folder). Furthermore, they provide companies with an ability to back up all essential business documents, both scanned and computer-generated, and may integrate optical character recognition technology so that full text searches may be performed on scanned documents.

In popular operating system platforms (e.g., Microsoft Windows family), a user navigates the local file system using the integrated operating system file management system (e.g., Windows Explorer). Through the use of this tool, documents can be manipulated in a variety of ways, e.g., moved, copied, and deleted. Many computer users have grown accustomed to using integrated file management systems, and are thus reluctant to switch to another file management tool to perform these operations. Document management systems from third-party vendors generally provide enhanced file management systems.

In addition, a benefit of document management systems is that they facilitate collaboration. One such method is providing document distribution functionality so that one user can easily share documents with or send documents to other users, devices or systems. Unfortunately, the document distribution functionality of document management systems generally calls for a user to manually select an appropriate distribution function for each document in the document management system. Additionally, the document distribution functionality of document management systems generate a high level of network traffic when documents are distributed. This traffic reduces the amount of system resources available for other functions. Thus, it would be preferable if documents could be transferred without generating a high level of network traffic.

BRIEF SUMMARY OF THE INVENTION

In accordance with the present invention, there is provided a method and system for transferring documents without generating a high level of traffic.

In accordance with another aspect, the present invention provides a method for distributing a document to at least one destination. The method includes receiving document data representative of an electronic document to be distributed; creating a job by associating the document with at least one printer job language command, wherein the printer job language command includes instructions for the distribution of the job; and distributing, on the basis of the printer job language command, the job to at least one destination.

In accordance with another aspect, the present invention provides a system for distributing a document to at least one destination. The system includes means adapted for receiving data representative of an electronic document to be distributed; job creating means adapted for associating at least one printer job language command with the document, wherein the printer job language command includes instructions for the distribution of the job; and distributing means adapted for distributing the job to at least one destination on the basis of the printer job language command.

These and other aspects, advantages and features of the invention will be understood by one of ordinary skill in the art upon reading and understanding of the specification.

DESCRIPTION OF EXAMPLE EMBODIMENTS OF THE INVENTION

Figure 1:
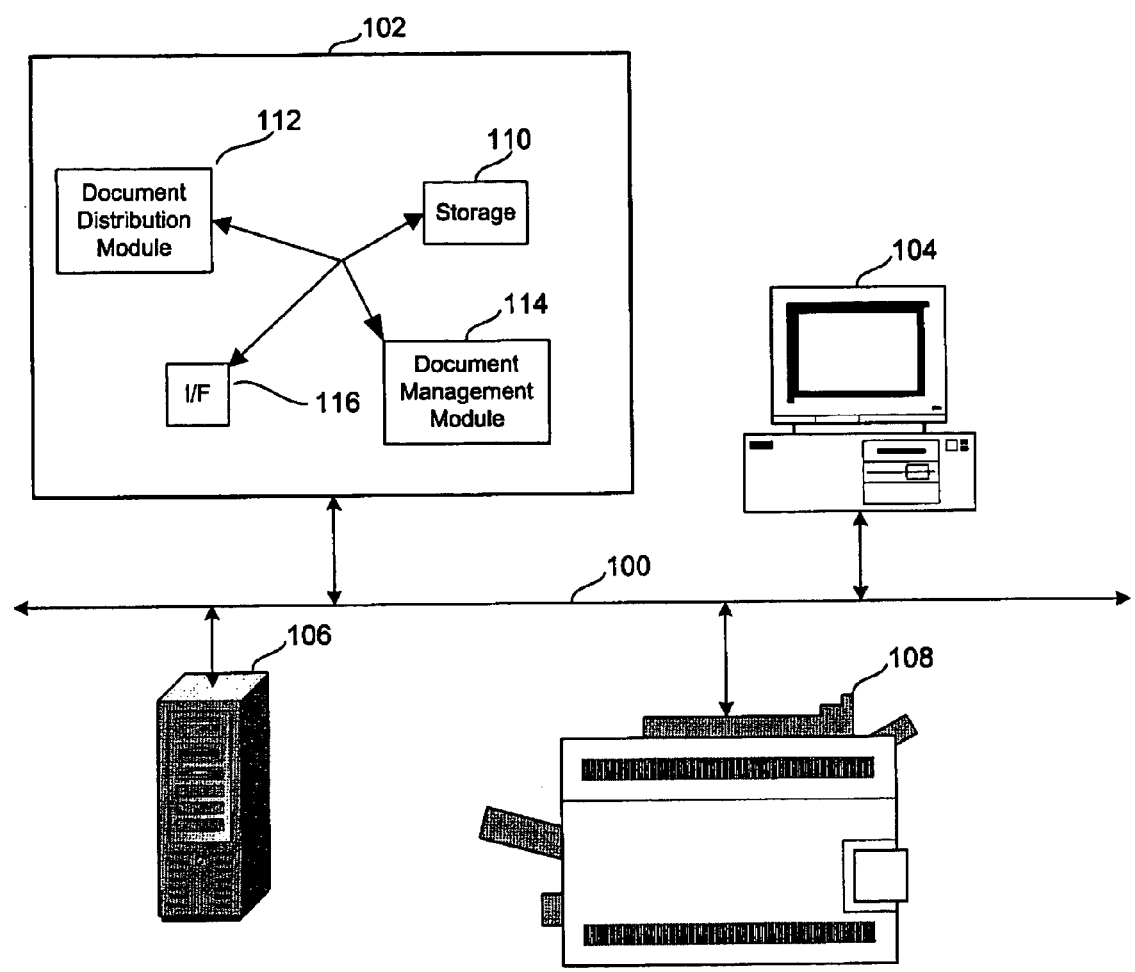
FIG. 1 illustrates an example of a network system for implementing the present invention.

Referring now to FIG. 1, an illustration of a network environment for practicing the present invention is provided. The system comprises a data transport network 100 illustrative of a LAN or WAN environment in which a preferred embodiment is provided, such as a packet-switched TCP/IP-based global communication network. The network 100 is suitably any network and is preferably comprised of physical layers and transport layers, as illustrated by a myriad of conventional data transport mechanisms like Ethernet, Token-Ring™, 802.11(b), or other wire-based or wireless data communication mechanisms as will be apparent to one of ordinary skill in the art.

Connected to a data transport network 100 is a document management platform 102. In the presently preferred embodiment, the document management platform preferably is a plug-n-play device having a hardware component consisting of a closed-box server that is easy to install, configure and support, and software components, both of which will be described in greater detail hereinbelow. The document management platform is suitably operable to provide services to at least one computer 104, at least one image generating device 108, and/or at least one server 106 connected to network 100. It is suitably a document distribution solution with document management capabilities.

The document management platform 102 suitably replaces or supplements existing facsimile, print and electronic mail servers, and preferably offers a more efficient method of transmitting, tracking and storing business-to-business documents. The document management platform 102 is preferably a client/server system, which is suitably implemented in both single and collaborative corporate workgroups (although not limited to such environments) and designed to increase productivity and reduce costs by making document communications more simple and reliable. The document management platform 102 suitably provides functionality enabling users to share documents and conduct collaborative work between various workgroups. Also connected to data transport network 100 is computer 104. The computer 104 is suitably either a server or client running on any OS, such as Windows NT, Windows 2000, Windows XP, Unix, Linux, Macintosh or other operating system. In addition, the computer 104 is suitably a thick client or thin client, as will be appreciated by those skilled in the art. For example, LAN environment, the document management platform 102 provides services from a "thin" browser-based client. The disclosed document management platform architecture is suitably accommodating for a "thick client" driver-based computer 104 and for a "thin client" browser-based computer 104.

At least one image generating device 108 is connected to data transport network 100. The image generating device is suitably a device such as a printer, facsimile machine, scanning device, copier, multi-function peripheral ("MFPs"), or other like peripheral devices. The image generating device 108 is suitably any networked image generating device as will be appreciated to one of ordinary skill in the art. The image generating device 108 preferably has an internal device controller suitably acting as a fully functional server with the necessary hardware and software that ensure proper operation of the image generating device as will be appreciated by those skilled in the art. In addition, the image generating device 108 preferably comprises internal storage, which is suitably a hard disk and random access memory ("RAM") as will be appreciated by those skilled in the art.

Optionally, a server 106 is also connected to data transport network. Because both the image generating device and the document management platform 102 suitably have server functionality, an additional server is not necessary to practice the present invention. However, corporate networks rarely have only one server, and often have more than two servers, wherein the servers may be configured to perform different tasks. The server 106 is suitably any fully functional server with the necessary hardware and software to ensure proper operation. The server 106 is suitably a data archiving, and the like, an electronic mail server, an application server, or any server configured for performing a function across a network.

The document management platform 102 preferably comprises a document distribution module 12 and a document management module 114. It should be noted that the document management platform 102 is not limited to these particular modules, and suitably comprises additional modules for device management. The main function of the document management module 114 is to store documents in a central document repository and to facilitate user capability to modify documents, collaborate during document editing, and search and locate stored documents. The main function of the document distribution module 112 is to route jobs to their destinations such as image generating devices, servers, computers, a document repository, etc.

The document management platform 102 also suitably comprises internal storage 110, in which at least one document repository or data storage area is suitably maintained. The document management platform 102 preferably interfaces with data transport network 100 via network interface 116. Thus, the document management platform 102, server 106, computer 104 and at least one image generating device 108 are in shared communication.

The computer 104 suitably represents either a thick client or and a thin client with general interfaces to the document management platform 102. The computer 104 interfaces with the document distribution module 112 for document distribution to selected devices. The document distribution module 112 suitably reports back to the computer 104 the status of the documents forwarded to the document distribution module 112 for distribution.

The document management module 114 works with the document distribution module 112 and its components to enable users to quickly store and retrieve documents from a central repository, which is preferably stored in storage 110 on the document management platform 102, but is also suitably stored on any storage device in communication with data transport network 100. The repository allows a user to share documents and conduct collaborative work between various workgroups.

When the document management module 114 receives a document in image form, such as it would from a facsimile or scanning device, it suitably routes the image to the repository for storage. The image can also be forwarded to the document distribution module 112 for further routing to an output device, e.g., a printer. In addition, the image file is also suitably routed to other document management systems of a remote appliance over the network, and preferably ODMA compliant. A document received via email device is suitably processed as text or an attachment to a message and forwarded to the document management module 114. Both an image and a processed email document can be routed to the printer, repository, and other document management platform, and/or other output devices via the document distribution module 112.

As disclosed, the computer 104 communicates documents and files through the document distribution module 114 to several destination devices. A primary function of the document distribution module 114 is to send a document from the document management platform 102 to at least one specified destination 108, which is accomplished in a succession of major functional steps. In a presently preferred embodiment, the document distribution module 114 comprises, with general reference to FIG. 2, the document distribution system 200. The document distribution system 200 generally includes at least one client computer 104, a document to be distributed, a job creating means, a distributing means, and at least one destination 108. The above components cooperate to enable document distribution according to the present invention through the following steps. A user on the client computer 104 creates a document, such as a word processing document, a spreadsheet, etc., that the user desires to distribute to at least one destination 108. Upon the user creating the document and identifying at least one destination 108 for the document, the job creating means creates a job. As used herein, the job is the document to be distributed having associated therewith one or more commands that define the destination for the document. According to a preferred embodiment, the job comprises an association of the document to be distributed and at least one printer job language ("PJL") command, wherein the PJL command includes instructions for the distribution of the job. The job creating means can be any device, code, system or method, etc., as known in the art, for creating such commands and associating the commands with the document. Additionally, the job creating means may reside on the computer 104, on the document management platform 102, on the document distribution module 112, on a combination thereof, or on any other suitable location.

Once the job is created, it is submitted across the network 100 to the document distribution module 112, as represented by arrow 210. According to a preferred embodiment, the document distribution module 112 is provided with the distributing means adapted for facilitating the receiving of the job and the distributing of the job to the at least one destination 108. According to a further example embodiment, the distributing means comprises a document distribution queue 220. The document distribution queue 220 receives the job and reads the commands associated with the job, such as the PJL commands. The document distribution queue 220 does not point to any destination 108, but is adapted to read the commands and identify which destinations 108 to which the job should be distributed. Once the document distribution queue 220 has read the commands, it distributes the job, as represented by arrows 230, to a destination queue 205. The destination queue 205 receives the job, performs appropriate operations as known in the art, and sends the job to the destination 108 associated with the destination queue 205.

Figure 2:
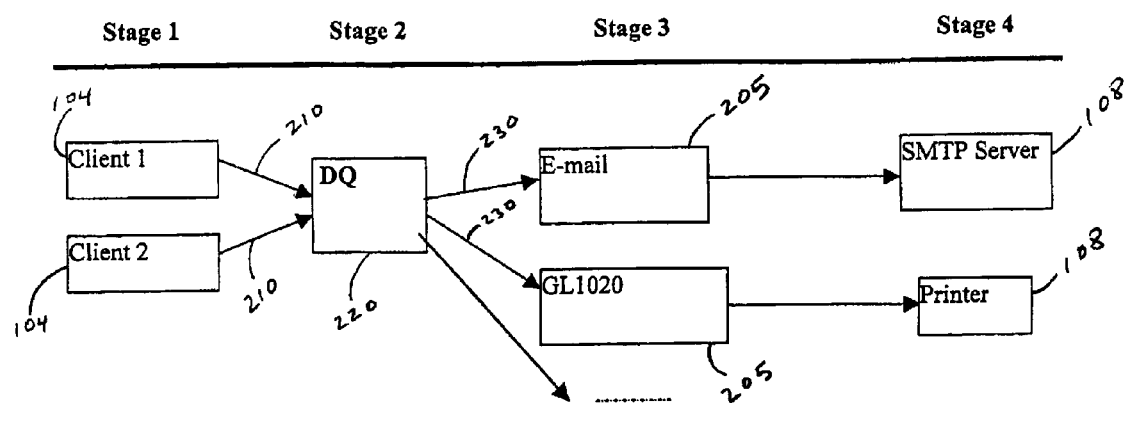
FIG. 2 generally illustrates an example document distribution system according to the present invention.

FIG. 2 illustrates an example of a document distribution system 200 according to the present invention. A user, on computer 104, first creates a document to be distributed to at least an email destination 108 and a printer destination 108. After the document has been created and the desired destinations 108 identified, the job creating means associates with the document a first command, such as a PJL command, for instructing the distribution of the job to the email destination and a second command, such as a PJL command, for instructing the distribution of the job to the printer destination. Only one document is created and each command is associated with the same document. The job is then submitted, via the network 100, as shown by arrow 210, to the document distribution queue 220. The document distribution queue 220 receives the job and reads the commands associated with the job. Based on the instructions provided by the commands, the document distribution queue 220 distributes the job to the email destination queue and the printer destination queue. After the job arrives at each destination queue, it is submitted to the respective destinations, i.e., email server and printer, respectively, for further processing.

As evidenced by the preceding example, the document distribution system 200 of the present invention advantageously reduces the amount of network traffic generated by a distribution request. When a user creates a document for distribution to multiple destinations 108, one job with multiple commands (e.g., PJL commands) is sent to the document distribution queue 220. The document distribution queue 220 reads the commands and sends the job to each desired destination 108. Thus, the present invention reduces network traffic by, inter alia, causing only one job to be sent to the distribution queue 220, rather than multiple jobs, with each job representing a different destination 108.

Figure 3:
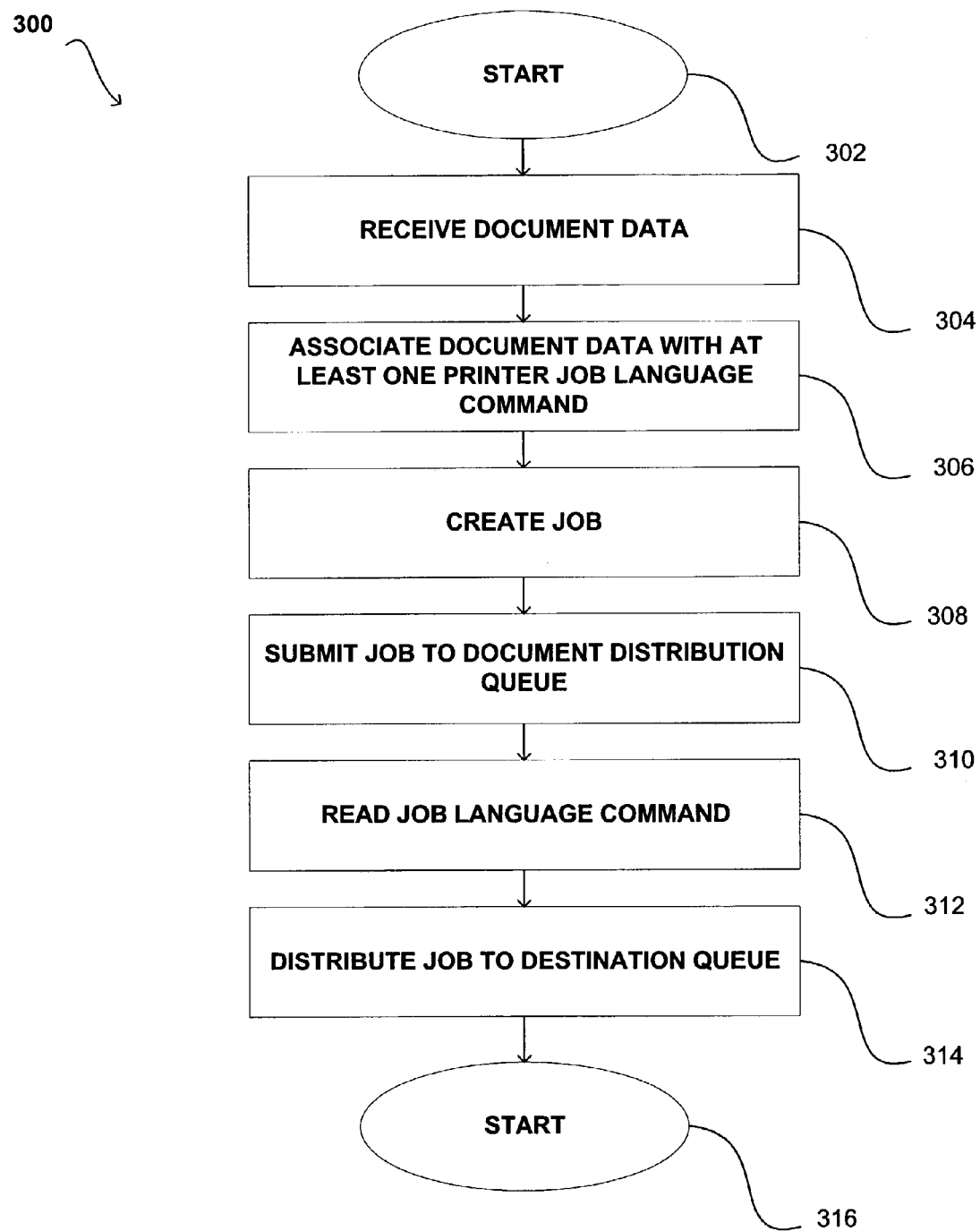
FIG. 3 is a flow chart illustrating an example method according to the present invention.

With reference to FIG. 3, illustrated is a flow chart depicting an example method according to the present invention. The method begins at step 304 with the receipt of document data. As previously discussed, the receipt of document data can be performed in a plurality of manners, such as, for example, the user creating a document with a software application. The method continues at step 306 with associating the document data with at least one printer job language command, thereby creating a job at step 308. The job is then submitted in step 310 to a document distribution queue, as described above, where the job language commands are read in step 312. In step 314, the job is distributed to a destination queue based on the job language commands. It is to be understood that FIG. 3 presents an example method, and that other steps and/or elements are contemplated for use with the present invention.

Although system as described runs on a network appliance, it is appreciated that it can also run on other operating systems, for example, Linux (and other Unix operating systems), and OS by Apple Computers. Although the preferred embodiment has been described in detail, it should be understood that various changes, substitutions, and alterations can be made therein without departing from the spirit and scope of the invention as defined by the appended claims. It will be appreciated that various changes in the details, materials and arrangements of parts, which have been herein described and illustrated in order to explain the nature of the invention, may be made by those skilled in the area within the principle and scope of the invention as will be expressed in the appended claims.

What is claimed is:

1. A method for distributing a document to at least one destination, the method comprising:

receiving document data representative of an electronic document to be distributed into a document processing device including a processor and memory;

associating each of a plurality of device queues with a unique document processing functionality; creating a job by appending to the document data at least one printer job language command, wherein the at least one printer job language command includes instructions for the distribution of the job via at least one of facsimile and e-mail by a document distribution queue and device data specifically identifying at least one device queue for distribution of the electronic document wherein the document distribution queue is not pre-associated with the document output destination;

associating each device queue with the document output destination;

communicating the document data and at least one appended printer job language command to the document distribution queue via a data network;

receiving, into the document distribution queue, the document data and at least one appended printer job language command; parsing, via the document distribution queue, the appended printer job language command from the document data;

distributing the job by a processor, on the basis of parsed printer job language command, inclusive of the at least one printer job language command, to a facsimile destination or an e-mail destination corresponding to at least one device queue specified within the parsed printer job language command; and processing each job received into each device queue in accordance with the document processing functionality associated therewith.

2. The method of claim 1 further comprising, after parsing the print job language command, distributing the job to a device queue by the document distribution queue, wherein the device queue points to the document output destination.

3. The method of claim 1, further comprising selecting the document output destination from the group consisting of an image forming device, an email system, a web publication system, and a document management system.

4. The method of claim 1, wherein the document is distributed to a plurality of document output destinations.

5. The method of claim 2, wherein the document is distributed to a plurality of document output destinations.

6. A system for distributing a document to at least one destination, wherein the system comprises:
  means for receiving data representative of an electronic document to be distributed into a document processing device including a processor and memory;
  a plurality of device queues, each device queue having associated therewith a document processing functionality;
  job creating means for appending at least one printer job language command to the document data, wherein the at least one printer job language command includes instructions for the distribution of the job via at least one of facsimile and e-mail by a document distribution queue and device data specifically identifying at least one device queue for distribution of the electronic document wherein the document distribution queue is not pre-associated with the document output destination;
  means for associating each device queue with a document output destination;
  means for communicating the electronic document data and at least one appended printer job language command to the document distribution queue via a data network;
  means for receiving, into the document distribution queue, the document data and at least one appended printer job language command;
  means for parsing, via the document distribution queue, the appended at least one printer job language command from the document data;
  distributing means for distributing the job, inclusive of the at least one printer job language command, to a facsimile destination or an e-mail destination corresponding to at least one device queue specified within the at least one printer job language command on the basis of parsed at least one printer job language command; and
  means for processing each job received into each device queue in accordance with the document processing functionality associated therewith.

7. The system of claim 6, wherein the document distribution queue does not point to the document output destination.

8. The system of claim 7, wherein the document distribution queue is further adapted to distribute the job, on the basis of the at least one printer job language command, to a device queue, wherein the device queue points to the document output destination.

9. The system of claim 6, wherein the document output destination is selected from the group consisting of an image forming device, an email system, a web publication system, and a document management system.

10. The system of claim 6, wherein the document is distributed to a plurality of document output destinations.

11. The system of claim 8, wherein the document is distributed to a plurality of document output destinations.

\* \* \* \* \*

UNITED STATES PATENT AND TRADEMARK OFFICE
CERTIFICATE OF CORRECTION

PATENT NO. : 7,657,608 B2  Page 1 of 1
APPLICATION NO. : 10/675737
DATED : February 2, 2010
INVENTOR(S) : Wangoo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1083 days.

Signed and Sealed this

Twenty-eighth Day of December, 2010

David J. Kappos
*Director of the United States Patent and Trademark Office*